United States Patent [19]

Hegg et al.

[11] Patent Number: 5,383,053
[45] Date of Patent: Jan. 17, 1995

[54] VIRTUAL IMAGE DISPLAY HAVING A HIGH EFFICIENCY GRID BEAMSPLITTER

[75] Inventors: Ronald G. Hegg, Los Angeles; Mao-Jin Chern, Rancho Palos Verdes; Anson Au, Los Angeles, all of Calif.

[73] Assignee: Hughes Aircraft Company, Los Angeles, Calif.

[21] Appl. No.: 864,864

[22] Filed: Apr. 7, 1992

[51] Int. Cl.$^6$ ............................................... G02B 5/30
[52] U.S. Cl. ..................................... 359/486; 359/494; 359/495
[58] Field of Search ............... 359/629, 630, 631, 633, 359/636, 483, 485, 486, 487, 494, 495, 583; 340/705

[56] References Cited

U.S. PATENT DOCUMENTS

| | | | |
|---|---|---|---|
| 3,508,809 | 4/1970 | Wilder et al. | 359/495 |
| 3,549,803 | 12/1970 | Becht et al. | 359/858 |
| 4,007,979 | 2/1977 | Coblitz | 359/487 |
| 4,221,464 | 9/1980 | Pedinoff et al. | 359/486 |
| 4,670,744 | 6/1987 | Buzak | 340/705 |
| 4,901,084 | 2/1990 | Huguenin et al. | 250/332 |
| 4,963,003 | 10/1990 | Hiiro | 359/495 |
| 4,987,410 | 1/1991 | Berman et al. | 340/705 |

FOREIGN PATENT DOCUMENTS

| | | | |
|---|---|---|---|
| 63-168626 | 7/1988 | Japan . | |
| 0025803 | 1/1990 | Japan | 359/495 |
| 1321303 | 6/1973 | United Kingdom | 359/487 |
| 2154757 | 9/1985 | United Kingdom | 340/705 |

OTHER PUBLICATIONS

Freeman; "Head-Up Displays-Part 2", Optics Technology, Aug. 1969, pp. 175-182.

Primary Examiner—Ricky D. Shafer
Attorney, Agent, or Firm—Leonard A. Alkov; W. K. Denson-Low

[57] ABSTRACT

A focusable virtual image display system employing a focusable image source such as a cathode ray tube and imaging optics to provide a virtual image. The virtual image is viewable by a user and its effective range may be changed without changing the apparent field of view or resolution. By placing the focus point of the imaging optics at the design eye, the image source is moved backwards and forwards, thus effectively changing the range of the virtual image observed by the user without changing the apparent field of view or resolution. The present invention allows the user to adjust the focus position of the virtual image of the image source by moving it relative to the imaging optics, while maintaining the size and resolution of the image. If the user wants to move the image further away, when the image source is moved, the imaging optics moves the virtual image further away and magnifies the image such that the angular field of view stays the same. The user cannot distinguish between the sizes, although the focus will be more comfortable for a particular accommodation range. The relative cost of the virtual image display system is relatively less expensive than large screen monitors due to the nature and complexity of the smaller components. By including a focus adjustment mechanism, the focusable virtual image display monitor has an added feature that a conventional large screen monitor does not provide.

20 Claims, 1 Drawing Sheet

VIRTUAL IMAGE DISPLAY HAVING A HIGH EFFICIENCY GRID BEAMSPLITTER

BACKGROUND

The present invention relates generally to virtual image display systems, and more particularly, to an on-axis or near on-axis virtual image display system having a high efficiency grid beamsplitter.

The color and large screen monitor market for workstations and personal computers is relatively large, yet the price of the monitors is relatively high. Also, the monitor size is quite large. Consequently, using a virtual image display as a monitor allows for the use of a smaller image source that is subsequently magnified to produce the viewed image. However, the relative image brightness of the virtual image is low.

For example, virtual image display systems have employed conventional beamsplitters in order to reduce the size of the system. The systems also include a CRT or other image source and a reflecting concave mirror. However, a conventional beamsplitter employed in an unpolarized virtual image display systems theoretically only 50% reflective and 50% transmissive (50—50). The light from the CRT is reflected off the beamsplitter and then reflects off the concave mirror, and is then retransmitted through the beamsplitter. Consequently, the theoretical efficiency of the beamsplitter is 25% (=50% * 50%). In practice, multilayer beamsplitters or beamsplitters with metal coatings are typically about 40—40, which drops the efficiency down to 16%. Beamsplitters with multilayer dielectric coatings, can theoretically come close to the 50—50 performance level, but suffer from wavelength and angular bandwidth limitations.

If the image source in the virtual image display system provides polarized light to begin with, than the beamsplitter coating can be polarization sensitive. Adding a quarter-wave plate between the beamsplitter and the concave mirror provides a theoretical efficiency of 100%. However, such coatings are highly limited to on-axis collimated rays or a single wavelength. These coatings are also quite expensive since they require a number of dielectric layers, and therefore only small beamsplitters are made in this way.

Therefore, it would be an advance in the monitor art to have a virtual image monitor system that employs a high-efficiency beamsplitter that maintains the overall system brightness of the virtual image display.

SUMMARY OF THE INVENTION

In order to provide for the above advances, the present invention comprises a on-axis virtual image display system employing a high efficiency grid beamsplitter. An s-polarized image source, such as a polarized cathode ray tube (CRT) display or a polarized liquid crystal display (LCD), for example, has its s-polarized output image coupled through a relay lens. The high efficiency grid beamsplitter is employed to reflect the s-polarized image through a quarter wave plate and onto a totally reflecting concave mirror. The image reflected from the concave mirror passes is convened to p-polarized image and passes through the quarter wave plate and beamsplitter and is then projected to a viewer observing the image.

More particularly, a wide grid polarizer is used as the beamsplitting element in an on-axis, polarized virtual image display that utilizes a concave mirror as a primary eyepiece. The extinction ratio of the grid polarizer is not important, since the image is already polarized, only the relatively high-efficiency of the reflection and transmission of the preferred polarization is important. Given this fact, the grid polarizer is made with much less stringent requirements, which makes it more practical. The grid polarizer has an optically transparent substrate that is a flat piece of glass or plastic having approximately 0.15 $\mu m$ metal grid lines etched or embossed, for example, onto its surface. Aluminum is deposited on each line at an angle so that a bump is formed on the top of each grid line. The grid lines comprise metal "wires" that are spaced much less than the wavelength of visible light (0.45–0.65 $\mu m$) projected by the image source. Consequently, polarized light parallel to the direction of the grid lines is reflected, whereas light having the opposite polarization is transmitted.

If the reflection efficiency of the s-polarization provided by the grid beamsplitter is 80% and the transmission efficiency of p-polarization is 80%, then the overall efficiency is at least 64%. This efficiency is four times greater than a conventional beamsplitter (16%). Most grid polarizers are are designed to achieve 100% efficiency for each polarization to achieve very high extinction ratios and thereby achieve high contrast ratios. This requires very difficult process controls. The "efficiency" necessary for the present invention is satisfied easily with a relatively low extinction ratio (80—80 works out to an extinction ratio of 6.3 to 1). The wire grid polarizer provides for a higher-efficiency beamsplitter than a conventional multilayer or metal coated beamsplitter. Although, achieving 100% efficiency (reflection of s-polarization * transmission of p-polarization), is optimum, any transmission above 25% is a marked improvement over conventional beamsplitters.

Higher-efficiency is important to virtual image displays that use color CRTs as the image source. Since the brightness of the CRT is already compromised, any additional loss in the optical system is a problem. Therefore, the optics must be as efficient as possible. With an on-axis system that utilizes the concave mirror and beamsplitter, the efficiency drops even further. The beamsplitter becomes the weak link, and therefore, a high efficiency beamsplitter is necessary to make the system work efficiently.

Using a virtual image display as the monitor allows for a smaller image source that is subsequently magnified. The high-efficiency beamsplitter helps maintain the overall system brightness of the virtual image display.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
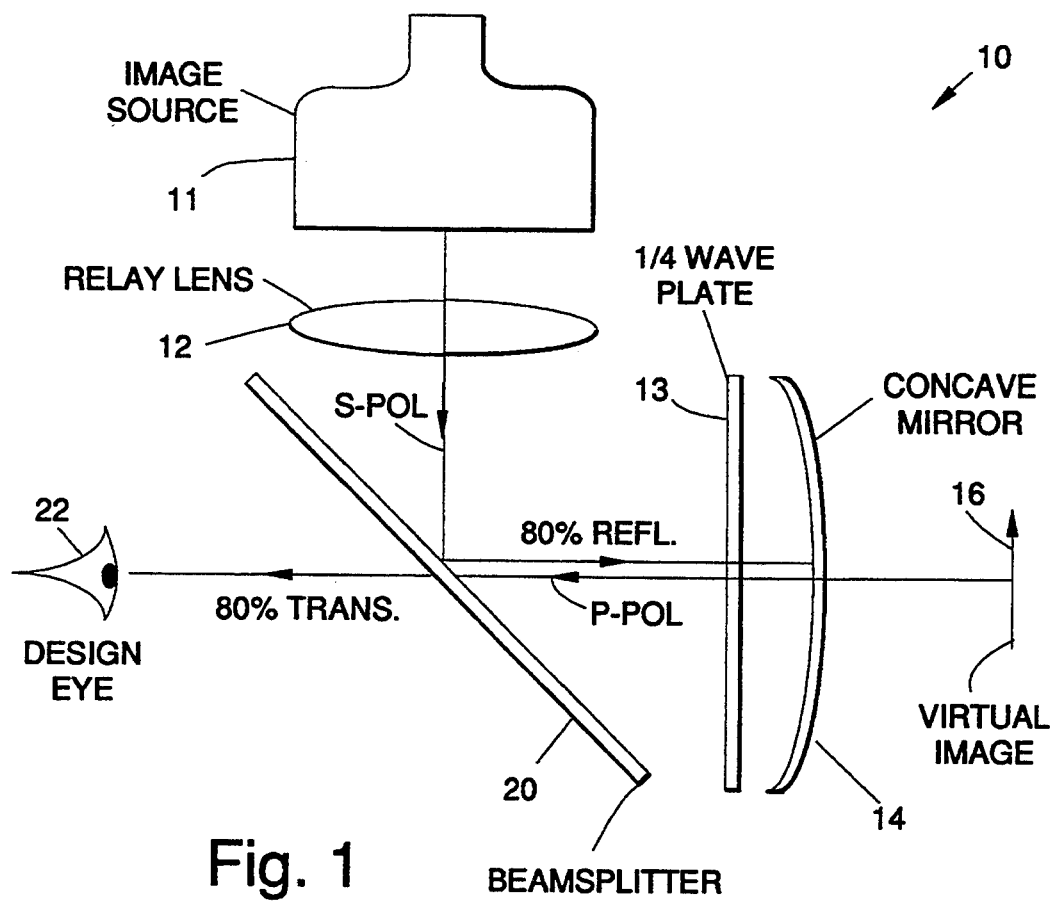
FIG. 1 shows an illustration of an on-axis virtual image display system employing a high efficiency grid beamsplitter in accordance with the principles of the present invention.

Referring to the drawing figures, FIG. 1 shows an illustration of an on-axis virtual image display system 10 employing a high efficiency grid beamsplitter 20 in accordance with the principles of the present invention. The on-axis virtual image display system 10 comprises an image source 11, such as a small screen cathode ray tube (CRT) or liquid crystal display (LCD), for example. The image source 11 may comprise a small polarized color image source 11, such as a Tektronix LCD color-shutter CRT, for example. A virtual image 16 of the face of the image source 11 is provided by the system 10.

The on-axis virtual image display system 10 also comprises relay optics 12 disposed between the image source and the high efficiency grid beamsplitter 20. A quarter-wave plate 13 and a concave mirror 14 are disposed along an optical path along which an image of the face of the image source is transmitted. Light from the image source 11 is reflected from the beam splitter 20 along the optical path to the quarter-wave plate and concave mirror 14 are located. The mirror is such that it has a focal point located at the position of a design eye 15.

The image on the image source 11 is re-imaged by the relay optics 12 to the focal point of the concave mirror 14. The beamsplitter 20 redirects the light to the mirror 14. The quarter-wave plate changes the linear polarization of the image to circular polarization. Upon reflection off the concave mirror 14, the image passes back through the quarter-wave plate and changes back to the opposite linear polarization. This polarization transmits through the beamsplitter 20 and is directed to the design eye 15. The design eye is the location that a user would position his or her eyes to view the virtual image 16.

Figure 2:
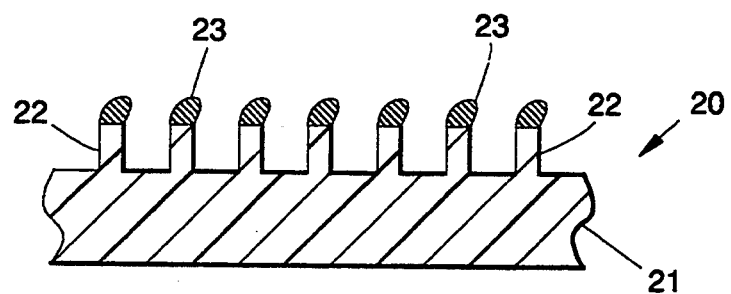
FIG. 2 is a cross-sectional view of the grid beamsplitter of FIG. 1.

FIG. 2 shows a cross-sectional view of the grid beamsplitter 20 of FIG. 1 illustrating its grid. The grid beamsplitter 20 comprises a grid polarizer having a relatively flat optically transparent substrate 21 that is a flat piece of glass or plastic having approximately 0.15 $\mu$m metal lines 22 formed on its surface. For example, on each line 22, aluminum may be deposited at an angle so as to deposit a bump 23 on the top of each grid line 22. The grid lines 22 comprise metal "wires" that are spaced much less than the wavelength of visible light (0.45-0.65 $\mu$m) projected from the image source 11. Therefore, polarized light parallel to the direction of the grid lines 22 is reflected, and light having the opposite polarization is transmitted by the grid beamsplitter 20.

It is to be understood that other techniques for making the grid beamsplitter 20 exist, such as by etching a photoresist material to make a mold and then depositing metal into grooves formed by the etching process. Electro-deposition processes may also be employed to fabricate the grid beamsplitter 20. The primary requirement of the grid beamsplitter 20 is that its metal lines be spaced at a distance smaller than the wavelength of visible light projected by the image source 11.

If the reflection efficiency of the s-polarization provided by the grid beamsplitter 20 is 80% and the transmission efficiency of p-polarization is 80%, then the overall efficiency is at least 64%. This efficiency is four times greater than a conventional beamsplitter (16%). Most grid polarizers are are designed to achieve 100% efficiency for each polarization to achieve very high extinction ratios and thereby achieve high contrast ratios. This requires very difficult process controls. The "efficiency" necessary for the present invention is satisfied easily with a relatively low extinction ratio (80—80 works out to an extinction ratio of 6.3 to 1).

Thus there has been described an on-axis virtual image display system having a high efficiency grid beamsplitter. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A virtual image display system comprising:
    an image source for providing polarized light disposed at one end an optical path;
    a relay lens disposed along the optical path for transmitting the polarized light provided by the image source;
    a concave mirror disposed at an opposite end of the optical path;
    a quarter-wave plate disposed along the optical path between the relay lens and the concave mirror, and
    a grid beamsplitter disposed along the optical path between the relay lens and the quarter-wave plate;
    and wherein the concave mirror produces a virtual magnified image of the image source at the location of a user.

2. The virtual image display system of claim 1 wherein the grid beamsplitter comprises:
    a relatively flat optically transparent substrate having metal grid lines with spacing much less than the wavelength of visible light projected by the image source formed on its surface, and wherein the grid beamsplitter provides relatively high transmission for light having a selected polarization and provides relatively high reflectivity for other polarizations within a predetermined visible optical range.

3. The virtual image display optical system of claim 2 wherein the substrate comprises glass.

4. The virtual image display optical system of claim 2 wherein the substrate comprises plastic.

5. The virtual image display optical system of claim 2 wherein the metal comprises aluminum.

6. The virtual image display optical system of claim 2 wherein the grid lines comprise a metal deposited at an angle to form a bump on the top of each grid line.

7. The virtual image display optical system of claim 1 wherein the image source comprises a cathode ray tube having a relatively small screen.

8. The virtual image display optical system of claim 1 wherein the image source comprises a liquid crystal display having a relatively small screen.

9. The virtual image display optical system of claim 1 wherein the image source comprises a polarized color image source having a relatively small screen.

10. In a virtual image display system comprising an image source for providing polarized light, a relay lens for transmitting the polarized light, a concave mirror reflecting the polarized light, and a quarter-wave plate disposed between the relay lens and the concave mirror, wherein the improvement comprises:
    a grid beamsplitter disposed between the relay lens and the quarter-wave plate.

11. The virtual image display system of claim 10 wherein the grid beamsplitter comprises:

a relatively flat optically transparent substrate having metal grid lines with spacing much less than the wavelength of visible light projected by the image source formed on its surface.

12. The virtual image display optical system of claim 11 wherein the substrate comprises glass.

13. The virtual image display optical system of claim 11 wherein the substrate comprises plastic.

14. The virtual image display optical system of claim 11 wherein the metal comprises aluminum.

15. The virtual image display optical system of claim 11 wherein the grid lines comprise a metal deposited at an angle to form a bump on the top of each grid line.

16. A grid beamsplitter for use in a virtual image display system including an image source for providing polarized light, a relay lens for transmitting the polarized light, a concave mirror reflecting the polarized light, and a quarter-wave plate disposed between the relay lens and the concave mirror, and wherein the beamsplitter is disposed between the relay lens and the quarter-wave plate, said grid beamsplitter comprising:

a relatively flat optically transparent substrate having metal grid lines with spacing much less than the wavelength of visible light projected by the image source formed on its surface.

17. The virtual image display optical system of claim 16 wherein the substrate comprises glass.

18. The virtual image display optical system of claim 16 wherein the substrate comprises plastic.

19. The virtual image display optical system of claim 16 wherein the metal comprises aluminum.

20. The virtual image display optical system of claim 16 wherein the grid lines comprising a metal deposited at an angle to form a bump on the top of each grid line.

* * * * *